C. W. SHAW.
HOOK.
APPLICATION FILED JUNE 13, 1911.
1,072,263.
Patented Sept. 2, 1913.
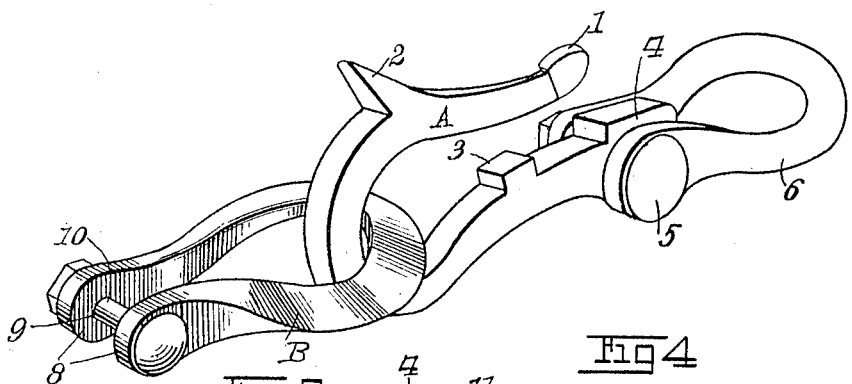
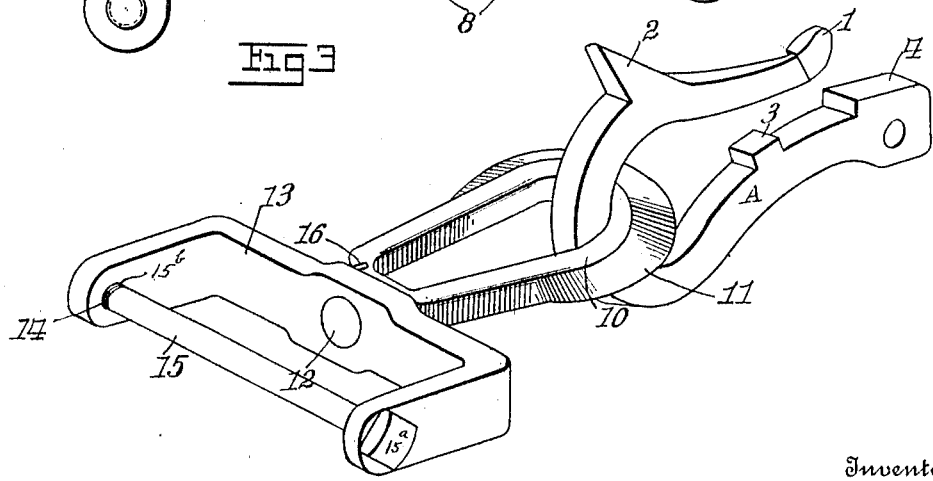
Inventor
Clarence W. Shaw
By Victor J. Evans
Attorney
Witnesses
M. H. Slifer
R. P. Cavanagh

UNITED STATES PATENT OFFICE.

CLARENCE W. SHAW, OF JOHNSTONVILLE, CALIFORNIA.

HOOK.

1,072,263.  Specification of Letters Patent. Patented Sept. 2, 1913.

Application filed June 13, 1911. Serial No. 632,930.

*To all whom it may concern:*

Be it known that I, CLARENCE W. SHAW, a citizen of the United States, residing at Johnstonville, in the county of Lassen and State of California, have invented new and useful Improvements in Hooks, of which the following is a specification.

The present invention relates to certain novel and useful improvements in hooks and connections therefor, and has particular application to a device of the class described designed for use with whiffletrees, harness attachments, chains and cables, and for any other purpose wherein its use will be found advantageous.

In carrying out my invention, it is my purpose to provide a hook, and a connection therefor, of such construction that when connected to the hook the liability of the accidental detachment of the parts is obviated.

A further object of my invention is to provide a device, wherein the hook is provided with retaining spurs or projections, designed when in use to coöperate with and hold, a ring, clevis or other attachment, which ring or clevis is also of a peculiar and novel construction.

It is also my purpose to provide a hook and connection embodying the desired features of simplicity, durability and strength, and which may be manufactured and marketed at a relatively low cost.

With the above-recited objects and others of a similar nature in view, the invention consists of the construction, combination and arrangement of parts, set forth in and falling within the scope of the appended claims.

In the accompanying drawing:—Figure 1 is a perspective view of a hook and connection embodying my invention. Fig. 2 is a plan view of the ring or clevis. Fig. 3 is a perspective view of a modification wherein one form of ring is attached to a connecting band or strap. Fig. 4 is a cross sectional view, taken on the line 4—4 of Fig. 2. Fig. 5 is a detail view in elevation of one side of the U-shaped metallic strap 13, showing the locking pin for the bolt 15.

Referring now to the accompanying drawings in detail, the letter A indicates the hook member as an entirety, said hook, which is formed of malleable iron or other suitable material, having an enlargement 1 at the point thereof, and spurs 2 and 3 formed below the point, on the outer and inner sides of the hook, respectively. The end of the shank portion of the hook is formed with a head 4, bored to receive the bolt 5 which connects the loop 6 thereto. This hook is designed to form a connection with the clevis or ring which is constructed as follows. In Figs. 1 and 2, the letter B indicates the clevis as a whole and it will be noted that the same is formed of a single piece of material, preferably malleable iron, the parallel ends 8—8 having apertures as at 9 for the passage of the bolts 10, by means of which the clevis is attached to a strap, harness or the like, said arms being bent in a widened loop 9' which is flattened and inclined toward the periphery thereof so as to assume the form of a spoon-shaped ring, the outer edge of the ring or spoon being relatively thinner than the inner edge thereof. In Fig. 3, the spoon-shaped ring is shown at 10, the outwardly tapered flange 11 thereof extending forward of the ring, while the latter instead of having a cross bolt is closed at its rear end and is provided with a swiveled bolt 12 by means of which the ring is connected to the U-shaped metallic strap 13, the latter having threaded bores 14 at the ends for the passage of the securing bolt 15, the latter having a squared head 15ª for the reception of a wrench and a threaded end 15ᵇ threaded into one of the bores of the strap and further secured by a locking pin 15ᶜ.

The above is a brief description of certain preferred forms of my invention and the construction and operation of the same will be readily apparent.

As heretofore stated, the invention is not limited in its useful application to any specific purpose, but may be employed in a great variety of connections, for instance, with whiffletrees, harness attachments and the like where it is desired to connect two parts so that they may be quickly and easily attached and detached, but at the same time held against accidental separation.

In use, the hook is preferably turned upward. In inserting the ring or clevis in the hook, the flattened side of the ring is faced to the shank of the hook with the round side thereof toward the person making the connection. The parts may then be slipped together and then turned so that the tapered flange or spoon-shaped end extends as is shown in Fig. 1. The connection cannot now work loose, as the spurs or projections upon the hook and the peculiar shape of the ring or clevis end will prevent this. When the hook is to be detached, the operation is reversed, the clevis being turned so that it may be slipped from off the hook.

By making the ring member or eye of spoon-like form and constructing the hook as shown, the eye may be slipped easily into the opening and yet when turned at an angle is so broad and wide that it is almost impossible to disconnect the same. Referring particularly to Fig. 1, wherein the two parts are shown connected, it will be seen that if the hook is turned at an angle to the eye, the spoon portion of the eye or rim is so broad that it would be impossible to disconnect the same from the hook. At the same time, when the eye is arranged at a predetermined angle or in alinement with the hook, it may be easily slipped into place. Likewise, the spur 2 is designed to act as a catch when the hook is twisted so that it will abut upon the top portion of the ring or eye and assist in preventing the derangement of the two parts. In order to disconnect the ring member from the hook, the free end of the former, that is the end to which the strap, chain or the like is connected, is disposed in a plane below that of the hook so that the forward edge of the flange 11 is disposed in a plane coincident with that of the space between the spur 3 and the adjacent part of the bill of the hook, thus enabling the ring member to be worked out of the hook. Thus, it will be seen that, to disconnect the ring member from the hook, it is necessary to move the former at a predetermined angle to the latter. By means of this construction, accidental disconnection of the parts is practically eliminated.

It will be seen that I have provided a device of simple yet strong and efficient construction, and one which is applicable to a great number and variety of purposes.

Having thus described the invention, I claim:—

1. The combination with a hook, of a ring-like member, a flange at the front and sides of such member and extending outwardly and laterally thereof.

2. The combination with a hook, of a ring-like member, a flange around the front and down the sides of such member and projecting outwardly thereof thence extending laterally at the front of said member.

In testimony whereof I affix my signature in presence of two witnesses.

CLARENCE W. SHAW.

Witnesses:
HARRY B. PEARCE,
W. H. SNYDER.

Copies of this patent may be obtained for five cents each, by addressing the "Commissioner of Patents, Washington, D. C."